United States Patent
Gao et al.

(10) Patent No.: US 12,347,144 B1
(45) Date of Patent: Jul. 1, 2025

(54) LINE-SCAN CAMERA CALIBRATION METHOD BASED ON AN AUXILIARY CAMERA AND DEVICE THEREOF

(71) Applicant: GUANGDONG UNIVERSITY OF TECHNOLOGY, Guangzhou (CN)

(72) Inventors: Jian Gao, Guangzhou (CN); Jinhui Zheng, Guangzhou (CN); Zhuojun Zheng, Guangzhou (CN); Lanyu Zhang, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 19/002,197

(22) Filed: Dec. 26, 2024

Related U.S. Application Data

(63) Continuation of application No. PCT/CN2024/108113, filed on Jul. 29, 2024.

(30) Foreign Application Priority Data

Apr. 7, 2024 (CN) .......................... 202410405378.3

(51) Int. Cl.
  *G06T 7/80* (2017.01)
  *G06T 3/60* (2024.01)

(52) U.S. Cl.
  CPC .................. *G06T 7/80* (2017.01); *G06T 3/60* (2013.01); *G06T 2207/10008* (2013.01)

(58) Field of Classification Search
  CPC .... G06T 7/80; G06T 3/60; G06T 2207/10008
  See application file for complete search history.

(56) References Cited

FOREIGN PATENT DOCUMENTS

| CN | 106289106 A | 1/2017 |
| CN | 109242909 A | 1/2019 |
| CN | 109272574 A | 1/2019 |
| CN | 114241177 A | 3/2022 |
| CN | 114419170 A | 4/2022 |
| CN | 116051659 A | 5/2023 |

(Continued)

OTHER PUBLICATIONS

Hui, Bingwei ("Line-scan camera calibration in close-range photogrammetry") Optical Engineering. (Year: 2012).*

(Continued)

*Primary Examiner* — Molly Wilburn

(57) ABSTRACT

A line-scan camera calibration method based on an auxiliary camera, including: calibrating the auxiliary camera, rigidly combining the auxiliary camera with a line-scan camera and installing the combined camera onto a motion platform, and placing a checkerboard calibration board within an imaging area of the combined camera; driving a motion platform to capture images and dynamic scanning images of the checkerboard calibration board, calculating a motion vector of the combined camera; calculating coordinates of registration points; fitting an equation of an imaging plane using coordinates of multiple registration points in the auxiliary camera coordinate system; calculating internal parameters of the line-scan camera and a rigid transformation matrix between the auxiliary camera and the line-scan camera based on properties of a rotation matrix and the line-scan camera imaging model. This application improves the calibration accuracy of the line-scan camera.

8 Claims, 6 Drawing Sheets

(56) References Cited

FOREIGN PATENT DOCUMENTS

| | | | |
|---|---|---|---|
| CN | 116147534 | A | 5/2023 |
| CN | 116188591 | A | 5/2023 |
| CN | 116681772 | A | 9/2023 |
| CN | 117994359 | A | 5/2024 |
| JP | 2022039906 | A | 3/2022 |
| WO | 2023045147 | A1 | 3/2023 |

OTHER PUBLICATIONS

Hui, Bingwei ("A Novel Line Scan Camera Calibration Technique with an Auxiliary Frame Camera") IEEE Transactions on Instrumentation. (Year: 2013).*

* cited by examiner

Using properties of the rotation matrix in a rigid transformation and the line-scan camera imaging model, transforming the coordinates of the multiple registration points in the auxiliary camera coordinate system into the line-scan camera coordinate system, and then, transforming the coordinates of the registration points in the line-scan camera coordinate system into a pixel coordinate system to obtain an intermediate relationship ⟶ S1051

Separating known parameters from the intermediate relationship to obtain a relationship for unknown parameters ⟶ S1052

Obtaining a unit normal vector of the line-scan camera based on the equation of the imaging plane of the line-scan camera in the auxiliary camera coordinate system, and solving for the internal parameters of the line-scan camera and the rigid transformation matrix between the auxiliary camera and the line-scan camera based on the unit normal vector and the relationship for the unknown parameters ⟶ S1053

FIG. 4

LINE-SCAN CAMERA CALIBRATION METHOD BASED ON AN AUXILIARY CAMERA AND DEVICE THEREOF

CROSS REFERENCE TO RELATED APPLICATIONS

This application claims foreign priority of Chinese Patent Application No. 202410405378.3, filed on Apr. 7, 2024 in the China National Intellectual Property Administration, the disclosures of all of which are hereby incorporated by reference.

TECHNICAL FIELD

The present disclosure relates to the technical field of camera calibration technology, in particular to a line-scan camera calibration method based on an auxiliary camera and device thereof.

BACKGROUND

In the technical field of optical measurement, camera calibration is a crucial step aimed at determining the camera's internal parameters (such as focal length, optical center, etc.) and external parameters (such as rotation matrix and translation vector), to achieve high-precision three-dimensional (3D) measurement and positioning. Line-scan camera, as a common type of industrial camera, have a calibration process that is somewhat unique due to its structural characteristics. Existing calibration methods for line-scan camera are typically based on a one-dimensional calibration object, where camera parameters are estimated by capturing images from different angles. However, these methods are often affected by factors such as the accuracy of the calibration object manufacturing and the conditions under which the images are acquired, making it difficult to achieve high-precision calibration results.

SUMMARY

The present disclosure provides a line-scan camera calibration method based on an auxiliary camera and a device thereof, to improve the calibration accuracy of line-scan cameras.

To realize the above objective, the present disclosure provides a line-scan camera calibration method based on an auxiliary camera, including the following steps: calibrating the auxiliary camera, and then rigidly combining the auxiliary camera with a line-scan camera to be calibrated to obtain a combined camera and installing the combined camera onto a motion platform, and placing a checkerboard calibration board within an imaging area of the combined camera; and driving a motion platform to capture images of the checkerboard calibration board taken by the auxiliary camera at an initial position and a final position, as well as dynamic scanning images taken by the line-scan camera, and calculating a motion vector of the combined camera in an auxiliary camera coordinate system; and calculating coordinates of registration points in the auxiliary camera coordinate system based on the motion vector and dynamic scanning images; and fitting an equation of an imaging plane of the line-scan camera in the auxiliary camera coordinate system using coordinates of multiple registration points in the auxiliary camera coordinate system; and calculating internal parameters of the line-scan camera and a rigid transformation matrix between the auxiliary camera and the line-scan camera based on properties of a rotation matrix and a line-scan camera imaging model.

Furthermore, the step of driving a motion platform to capture images of the checkerboard calibration board taken by the auxiliary camera at initial and final positions, as well as dynamic scanning images taken by the line-scan camera, and calculating a motion vector of the combined camera in an auxiliary camera coordinate system, including the following sub-steps: capturing the checkerboard calibration board image taken by the auxiliary camera at the initial position, driving the motion platform to move the combined camera along a straight line for a preset distance, enable the line-scan camera to capture the dynamic scanning images at a target number of rows, and capturing the checkerboard calibration board image taken by the auxiliary camera at the final position; and based on the checkerboard calibration board images taken by the auxiliary camera at the initial and final positions, calculating external parameters of the auxiliary camera at the initial position and the final position using an N-point perspective monocular visual positioning method; and calculating the motion vector of the combined camera in the auxiliary camera coordinate system based on the external parameters of the auxiliary camera at the initial position and the final position and the target number of rows.

Furthermore, the step of calculating coordinates of registration points in the auxiliary camera coordinate system based on the motion vector and dynamic scanning images includes: calculating the coordinates of the registration points in the auxiliary camera coordinate system using the motion vector, subpixel coordinates of the registration points in the dynamic scanning images, and subpixel coordinates of checkerboard corner points in the dynamic scanning images.

Furthermore, the step of calculating internal parameters of the line-scan camera and a rigid transformation matrix between the auxiliary camera and the line-scan camera based on properties of a rotation matrix and a line-scan camera imaging model, including the following sub-steps: using properties of the rotation matrix in a rigid transformation and the line-scan camera imaging model, transforming the coordinates of the multiple registration points in the auxiliary camera coordinate system into the line-scan camera coordinate system, and then, transforming the coordinates of the registration points in the line-scan camera coordinate system into a pixel coordinate system to obtain an intermediate relationship; and separating known parameters from the intermediate relationship to obtain a relationship for unknown parameters; and obtaining a unit normal vector of the line-scan camera based on the equation of the imaging plane of the line-scan camera in the auxiliary camera coordinate system, and solving for the internal parameters of the line-scan camera and the rigid transformation matrix between the auxiliary camera and the line-scan camera based on the unit normal vector and the relationship for the unknown parameters.

Furthermore, after the step of calculating internal parameters of the line-scan camera and a rigid transformation matrix between the auxiliary camera and the line-scan camera based on properties of a rotation matrix and a line-scan camera imaging model, the method further includes the following steps: establishing a camera parameter optimization model based on lens distortion model of the line-scan camera and least squares optimization principle; and solving the camera parameter optimization model to obtain parameter correction values for the line-scan camera; and correcting the internal parameters of the line-scan camera and the rigid transformation matrix between the auxiliary camera and the line-scan camera using the parameter correction values, obtaining optimized internal parameters and an optimized rigid transformation matrix of the line-scan camera.

The present disclosure further provides a line-scan camera calibration device based on an auxiliary camera, including: a combining unit, configured for calibrating the auxiliary camera, and then rigidly combining the auxiliary camera with a line-scan camera to be calibrated to obtain a combined camera and installing the combined camera onto a motion platform, and placing a checkerboard calibration board within an imaging area of the combined camera; and a first calculating unit, configured for driving a motion platform to capture images of the checkerboard calibration board taken by the auxiliary camera at an initial position and a final position, as well as dynamic scanning images taken by the line-scan camera, and calculating a motion vector of the combined camera in an auxiliary camera coordinate system; and a second calculating unit, configured for calculating coordinates of registration points in the auxiliary camera coordinate system based on the motion vector and dynamic scanning images; and a fitting unit, configured for fitting an equation of an imaging plane of the line-scan camera in the auxiliary camera coordinate system using coordinates of multiple registration points in the auxiliary camera coordinate system; and a third calculating unit, configured for calculating internal parameters of the line-scan camera and a rigid transformation matrix between the auxiliary camera and the line-scan camera based on properties of a rotation matrix and a line-scan camera imaging model.

Furthermore, the first calculating unit, specifically configured for: capturing the checkerboard calibration board image taken by the auxiliary camera at the initial position, driving the motion platform to move the combined camera along a straight line for a preset distance, enable the line-scan camera to capture the dynamic scanning images at a target number of rows, and capturing the checkerboard calibration board image taken by the auxiliary camera at the final position; and based on the checkerboard calibration board images taken by the auxiliary camera at the initial position and the final position, calculating external parameters of the auxiliary camera at the initial position and the final position using an N-point perspective monocular visual positioning method; and calculating the motion vector of the combined camera in the auxiliary camera coordinate system based on the external parameters of the auxiliary camera at the initial position and the final position and the target number of rows.

Furthermore, the second calculating unit, specifically configured for: calculating the coordinates of the registration points in the auxiliary camera coordinate system using the motion vector, subpixel coordinates of the registration points in the dynamic scanning images, and subpixel coordinates of checkerboard corner points in the dynamic scanning images.

The present disclosure further provides an electronic device, comprising the device comprises a processor and a memory; wherein the memory is configured to store program codes and transmit the program codes to the processor; the processor is configured to execute a line-scan camera calibration method based on an auxiliary camera.

The present disclosure further provides a non-transitory computer-readable storage medium, the non-transitory computer-readable storage medium is configured to store program codes, and when the program codes are executed by a processor, a line-scan camera calibration method based on an auxiliary camera is implemented by the processor.

From the above technical solution, it can be seen that the present application has the following advantages.

The present application provides a line-scan camera calibration method based on the auxiliary camera, which includes the following steps: calibrating the auxiliary camera, and then rigidly combining the auxiliary camera with a line-scan camera to be calibrated to obtain a combined camera and installing the combined camera onto a motion platform, and placing a checkerboard calibration board within an imaging area of the combined camera; driving a motion platform to capture images of the checkerboard calibration board taken by the auxiliary camera at an initial position and a final position, as well as dynamic scanning images taken by the line-scan camera, and calculating a motion vector of the combined camera in an auxiliary camera coordinate system; calculating coordinates of registration points in the auxiliary camera coordinate system based on the motion vector and dynamic scanning images; fitting an equation of an imaging plane of the line-scan camera in the auxiliary camera coordinate system using coordinates of multiple registration points in the auxiliary camera coordinate system; calculating internal parameters of the line-scan camera and a rigid transformation matrix between the auxiliary camera and the line-scan camera based on properties of a rotation matrix and a line-scan camera imaging model.

In this application, the calibrated auxiliary camera is rigidly combined with the line-scan camera to be calibrated, and high-precision calibration is performed on the motion platform. By calibrating the line-scan camera parameters based on the auxiliary camera, the line-scan camera calibration method not only reduces the number of images required during calibration but also improves calibration accuracy.

BRIEF DESCRIPTION OF THE DRAWINGS

In order to illustrate the technical solutions in the embodiments of the present application or the prior art more clearly, the following provides a brief introduction to the accompanying drawings that are required for the description of the embodiments or prior art. It is obvious that the drawings in the following description are only some embodiments of the present application. For those skilled in the art, without creative effort, other drawings can be derived from these drawings.

FIG. 4 is another detailed flowchart illustrating a line-scan camera calibration method based on an auxiliary camera according to an embodiment of the present application.

DETAILED DESCRIPTION OF THE EMBODIMENTS

The technical solutions in the embodiments of the present disclosure will be described clearly and completely with reference to the accompanying drawings in the embodiments of the present disclosure. Obviously, the described embodiments are only a part of the embodiments of the present disclosure rather than all of them. Based on the embodiments in the present disclosure, all other embodiments obtained by those skilled in the art without creative work shall fall within the scope of protection of the present disclosure.

Figure 1:
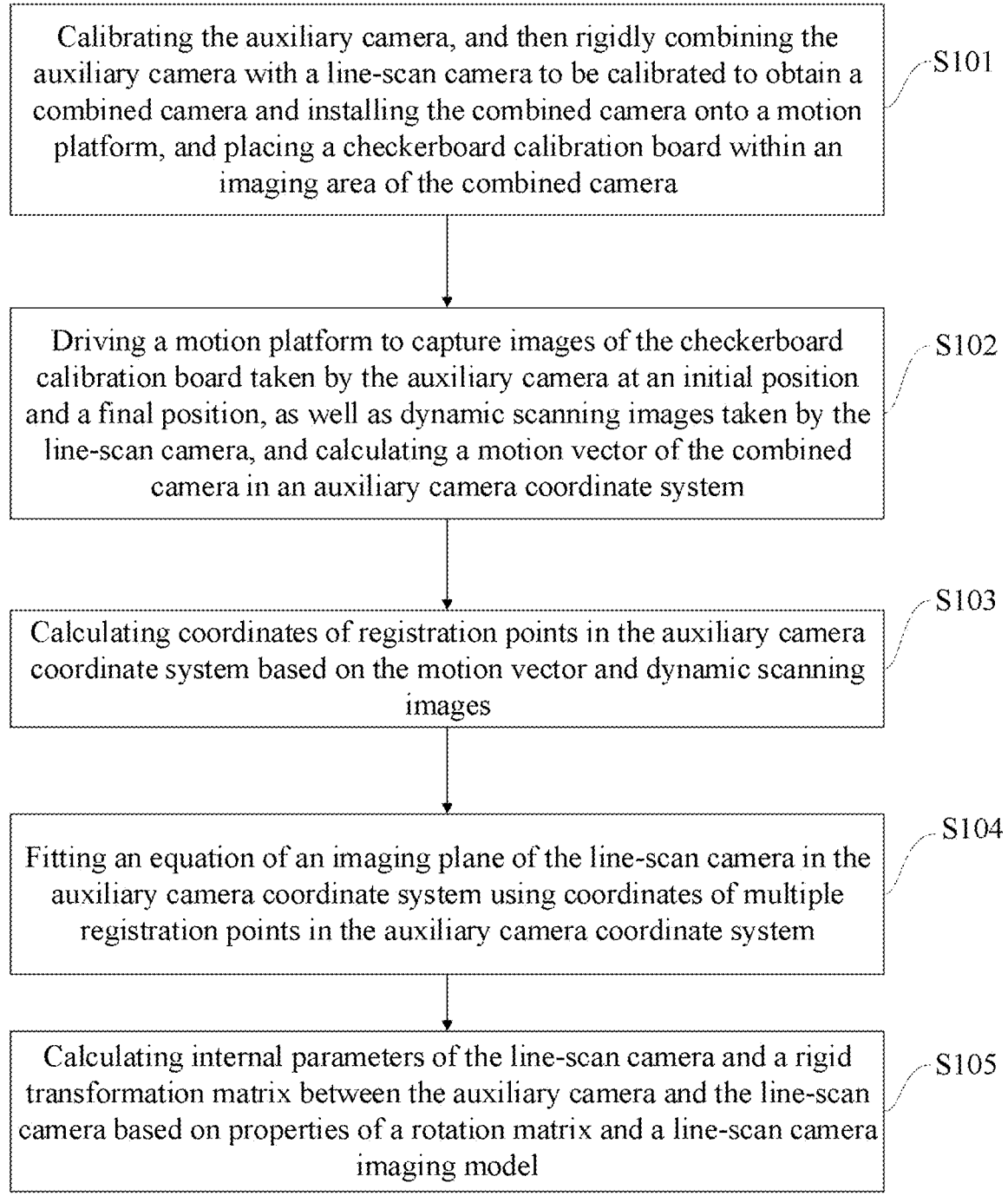
FIG. 1 is a flowchart illustrating a line-scan camera calibration method based on an auxiliary camera according to an embodiment of the present application.

The present disclosure provides a line-scan camera calibration method based on an auxiliary camera, referring to FIG. 1, the line-scan camera calibration method based on the auxiliary camera includes S101 to S105.

S101, Calibrating the auxiliary camera, and then rigidly combining the auxiliary camera with a line-scan camera to be calibrated to obtain a combined camera and installing the combined camera onto a motion platform, and placing a checkerboard calibration board within an imaging area of the combined camera.

This embodiment adopts an area array camera as the auxiliary camera, a Zhang Zhengyou calibration method is adopted to calibrate the auxiliary camera to obtain internal parameters of the auxiliary camera Pf.

Rigidly combining the auxiliary camera with a line-scan camera to be calibrated to obtain a combined camera and installing the combined camera onto a motion platform, and placing a checkerboard calibration board within an imaging area of the combined camera, to allow the auxiliary camera and the line-scan camera capture images of the checkerboard calibration board.

S102, Driving a motion platform to capture images of the checkerboard calibration board taken by the auxiliary camera at an initial position and a final position, as well as dynamic scanning images taken by the line-scan camera, and calculating a motion vector of the combined camera in an auxiliary camera coordinate system.

Figure 2:
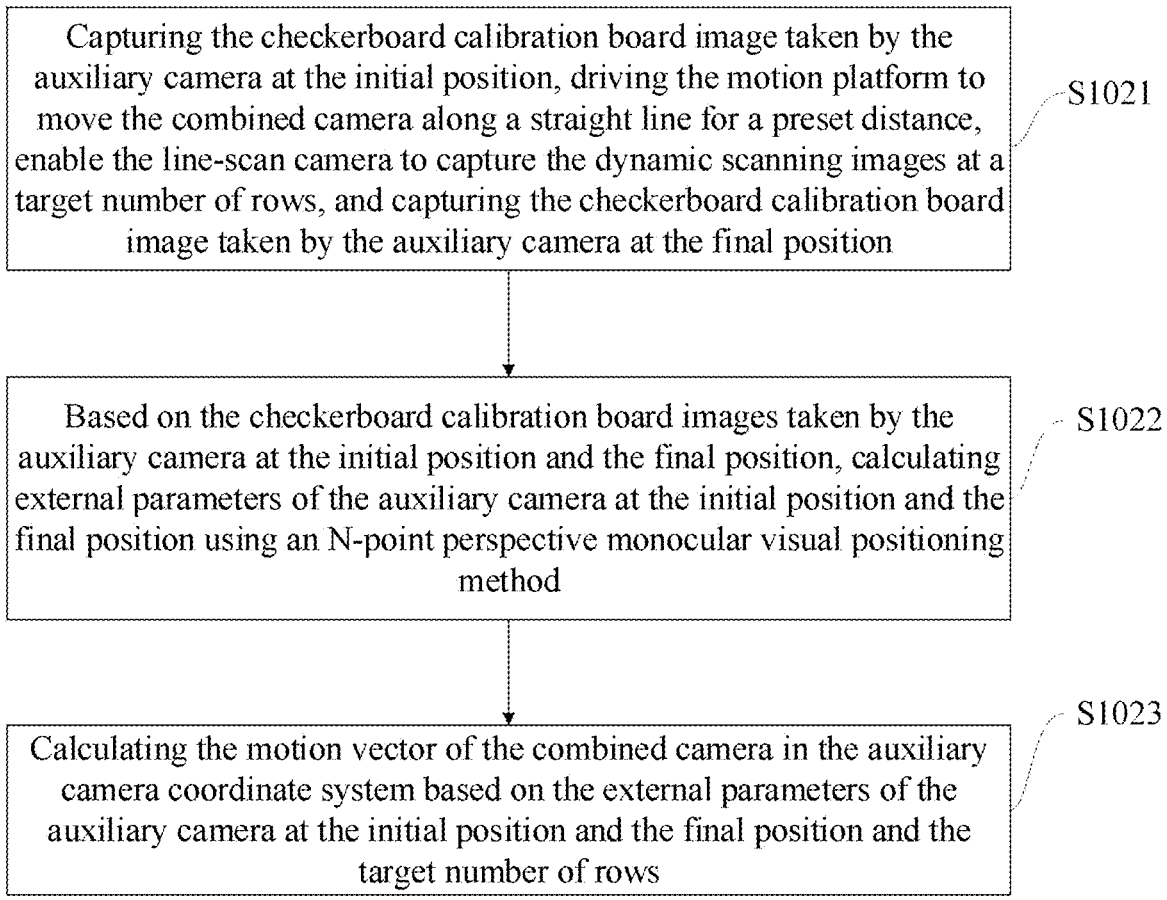
FIG. 2 is a detailed flowchart illustrating a line-scan camera calibration method based on an auxiliary camera according to an embodiment of the present application.

Please refers to FIG. 2, S102 includes S1021 to S1023.

S1021, Capturing the checkerboard calibration board image taken by the auxiliary camera at the initial position, driving the motion platform to move the combined camera along a straight line for a preset distance, enable the line-scan camera to capture the dynamic scanning images at a target number of rows, and capturing the checkerboard calibration board image taken by the auxiliary camera at the final position.

S1022, Based on the checkerboard calibration board images taken by the auxiliary camera at the initial position and the final position, calculating external parameters of the auxiliary camera at the initial position and the final position using an N-point perspective monocular visual positioning method.

S1023, Calculating the motion vector of the combined camera in the auxiliary camera coordinate system based on the external parameters of the auxiliary camera at the initial position and the final position and the target number of rows.

After placing the checkerboard calibration board, the checkerboard calibration board is captured by the auxiliary camera to obtain the checkerboard calibration board image at the initial position. Then, the motion platform is driven to move the combined camera along a straight line for a certain distance, allowing the line-scan camera to capture dynamic scanning images of the active rows, denoted as n, and the checkerboard calibration board image at the final position is captured by the auxiliary camera. By applying the N-point perspective monocular visual positioning method, the external parameters of the auxiliary camera at the initial position: $R_f^{(0)}$ and $T_f^{(0)}$, are determined. And external parameters of the auxiliary camera at the final position: $R_f^{(n)}$ and $T_f^{(n)}$, can be determined, too. The motion vector $V_f$ (unit: mm/pixel) of the combined camera in the auxiliary camera coordinate system is calculated by the following formula:

$$V_f = \begin{bmatrix} V_{f-X} \\ V_{f-Y} \\ V_{f-Z} \end{bmatrix} = \frac{T_f^{(n)} - T_f^{(0)}}{n}; \quad (1)$$

wherein, $V_{f-X}$, $V_{f-Y}$, and $V_{f-Z}$, represent movement speeds of the combined camera in X, Y, and Z directions, respectively, in the auxiliary camera coordinate system.

S103, Calculating coordinates of registration points in the auxiliary camera coordinate system based on the motion vector and dynamic scanning images.

Figure 3:
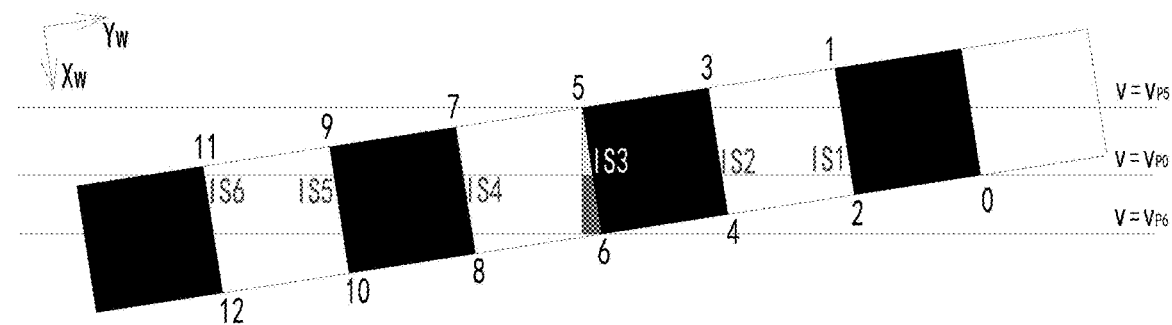
FIG. 3 is a schematic diagram illustrating a process of obtaining the coordinates of registration points according to an embodiment of the present application.

Specifically, calculating the coordinates of the registration points in the auxiliary camera coordinate system using the motion vector, subpixel coordinates of the registration points in the dynamic scanning images, and subpixel coordinates of checkerboard corner points in the dynamic scanning images. First, the sub-pixel corner coordinates of the dynamic scanning image of the line-scan camera are extracted, which allows for the determination of the sub-pixel coordinates (such as sub-pixel coordinate 0, sub-pixel coordinate 1 and sub-pixel coordinate 2) of multiple corner points such as $[u_{P0},v_{P0}]$, $[u_{P1},v_{P1}]$, $[u_{P2},v_{P2}]$ . . . (as shown in FIG. 3). Then, using the property that there is no perspective and distortion in the scan direction of the line-scan camera, the relationship between the corner coordinates and the registration point coordinates can be obtained:

$$\frac{|v_{P5} - v_{P0}|}{|v_{P5} - v_{P6}|} = \frac{|X_{WP5} - X_{WIS3}|}{|X_{WP5} - X_{WP6}|}; \quad (2)$$

wherein, $X_{WP5}$ is a X-coordinate of a corner point 5 in the world coordinate system, $X_{WP6}$ is a X-coordinate of a corner point 6 in the world coordinate system, and $X_{WIS3}$ is a X-coordinate of a registration point 3 in the world coordinate system. Here, the registration points are the intersections of grid lines of the checkerboard calibration board with the imaging plane of the line-scan camera. Registration points can be used to establish correspondence between different coordinate systems, thus enabling coordinate system transformation or mapping.

After obtaining the external parameters ($R_f^{(0)}$ and $T_f^{(0)}$) of the auxiliary camera at the initial position, and the motion vector $V_f$, the world coordinates ($X_W,Y_W,Z_W$) of the registration point with a y-coordinate of v in the pixel coordinate system can be transformed into the coordinates ($X_f^{(v)}$, $Y_f^{(v)},Z_f^{(v)}$) in the auxiliary camera coordinate system using the following formula (3):

$$\begin{bmatrix} X_f^{(v)} \\ Y_f^{(v)} \\ Z_f^{(v)} \end{bmatrix} = [R_f^{(0)}]_{3*3} \begin{bmatrix} X_W \\ Y_W \\ Z_W \end{bmatrix} + \left( [T_f^{(0)}]_{3*1} - v \begin{bmatrix} V_{f-X} \\ V_{f-Y} \\ V_{f-Z} \end{bmatrix} \right); \quad (3)$$

Through the above process, the coordinates of the registration points in the auxiliary camera coordinate system can be calculated.

S104, Fitting an equation of an imaging plane of the line-scan camera in the auxiliary camera coordinate system using coordinates of multiple registration points in the auxiliary camera coordinate system.

Scanning the checkerboard calibration board at multiple postures, a large number of registration point coordinates in the auxiliary camera coordinate system can be obtained. After eliminating outliers from the registration points, the least squares optimization principle can be used for plane fitting, obtaining the equation of the imaging plane of the line-scan camera in the area array camera coordinate system.

$$A_{fl}X_f + B_{fl}Y_f + C_{fl}Z_f + D_{fl} = 0; \quad (4)$$

wherein, $A_{fl}$, $B_{fl}$, $C_{fl}$ and $D_{fl}$ are coefficients of the equation of the imaging plane.

S105, Calculating internal parameters of the line-scan camera and a rigid transformation matrix between the auxiliary camera and the line-scan camera based on properties of a rotation matrix and a line-scan camera imaging model.

Please refers to FIG. 4, the S105 includes the following sub-steps of S1051 to S1053.

S1051, Using properties of the rotation matrix in a rigid transformation and the line-scan camera imaging model, transforming the coordinates of the multiple registration points in the auxiliary camera coordinate system into the line-scan camera coordinate system, and then, transforming the coordinates of the registration points in the line-scan camera coordinate system into a pixel coordinate system to obtain an intermediate relationship.

S1052, Separating known parameters from the intermediate relationship to obtain a relationship for unknown parameters.

S1053, Obtaining a unit normal vector of the line-scan camera based on the equation of the imaging plane of the line-scan camera in the auxiliary camera coordinate system, and solving for the internal parameters of the line-scan camera and the rigid transformation matrix between the auxiliary camera and the line-scan camera based on the unit normal vector and the relationship for the unknown parameters.

As the auxiliary camera and the line-scan camera are rigidly combined, the coordinate points in the auxiliary camera coordinate system can be transformed into the line-scan camera coordinate system. Without considering the lens distortion, the linear camera coordinate system can be transformed to the pixel coordinate system by the linear camera imaging model (formula (6)).

$$\begin{bmatrix} X_l \\ Y_l \\ Z_l \end{bmatrix} = [R_{fl}]_{3*3} \begin{bmatrix} X_f^{(v)} \\ Y_f^{(v)} \\ Z_f^{(v)} \end{bmatrix} + [T_{fl}]_{3*1}; \quad (5)$$

$$Z_l \begin{bmatrix} u \\ 0 \\ 1 \end{bmatrix} = \begin{bmatrix} f_x & 0 & u_0 \\ 0 & f_y & 0 \\ 0 & 0 & 1 \end{bmatrix} \begin{bmatrix} X_l \\ Y_l \\ Z_l \end{bmatrix}; \quad (6)$$

wherein, $R_{fl}$ is the rotation matrix of the rigid transformation, $T_{fl}$ is the translation vector of the rigid transformation, $f_x$ is the ratio of a focal length to the pixel size in the x-direction, and $f_y$ represents a ratio of the focal length to the pixel size in the y-direction. $u_0$ represents a principal point position in the x-direction, where the principal point is a perpendicular intersection point between the imaging plane and the optical axis.

Simplifying and combining equations (5) and (6) by utilizing the properties of the rotation matrix, to obtain equation (7).

$$f_x \frac{-r_{32}X_f^{(v)} + r_{31}Y_f^{(v)} - r_{13}t_y + r_{23}t_x}{-r_{12}X_f^{(v)} + r_{11}Y_f^{(v)} - r_{33}t_y + r_{23}t_z} = u - u_0; \quad (7)$$

wherein, $[R_{fl}]_{3*3} = \begin{bmatrix} r_{11} & r_{12} & r_{13} \\ r_{21} & r_{22} & r_{23} \\ r_{31} & r_{32} & r_{33} \end{bmatrix}$, r is an element of the rotation matrix $R_{fl}$, $$[T_{fl}]_{3*3} = \begin{bmatrix} t_x \\ t_y \\ t_z \end{bmatrix},$$

and $t_x$, $t_y$ and $t_z$ represent translation distances along the x, y, and z directions of the translation vector $T_{fl}$.

According to the direct linear transformation theory, separating all the known parameters (i.e., $X_f$, $Y_f$, $uX_f$, $uY_f$ and u), and recombining all the unknown parameters into new coefficients $m_i$ (i=1 . . . 6) to form a relationship for the unknown parameters, as shown in equation (8). The least squares optimization principle can be used to solve these coefficients from the overdetermined system of equations.

$$0 = m_1 X_f^{(v)} + m_2 Y_f^{(v)} + m_3 + m_4 u X_f^{(v)} + m_5 u Y_f^{(v)} + m_6 u; \quad (8)$$

wherein, $$\begin{bmatrix} m_1 & m_2 & m_3 \\ m_4 & m_5 & m_6 \end{bmatrix} = \begin{bmatrix} -u_0 r_{12} - f_x r_{32} & u_0 r_{11} + f_x r_{31} & -u_0 r_{33} t_y + u_0 r_{33} t_y + u_0 r_{23} t_z - \\ & & f_x r_{13} t_y + f_x r_{23} t_x \\ r_{12} & -r_{11} & r_{33} t_y - r_{23} t_z \end{bmatrix}.$$

The equation (8) describes the ideal line-scan camera imaging model. However, for precise geometric calibration, after solving for the linear coefficients in the model, it is necessary to further derive the geometrically meaningful imaging model parameters from these coefficients.

In the above steps, the equation of the imaging plane of the line-scan camera in the auxiliary camera coordinate system has been obtained, and consequently, the unit normal vector $(a_{fl}, b_{fl}, c_{fl})$ of the imaging plane of the line-scan camera can be determined. The unit normal vector $(a_{fl}, b_{fl}, c_{fl})$ can be expressed as follow:

$$\begin{bmatrix} \dfrac{A_{fl}}{\sqrt{A_{fl}^2 + B_{fl}^2 + C_{fl}^2}} \\ \dfrac{B_{fl}}{\sqrt{A_{fl}^2 + B_{fl}^2 + C_{fl}^2}} \\ \dfrac{C_{fl}}{\sqrt{A_{fl}^2 + B_{fl}^2 + C_{fl}^2}} \end{bmatrix} = \begin{bmatrix} a_{fl} \\ b_{fl} \\ c_{fl} \end{bmatrix}.$$

Through the rotation matrix after rigid transformation, to obtain:

$$\begin{bmatrix} 0 \\ 1 \\ 0 \end{bmatrix} = [R_{fl}]_{3*3} \begin{bmatrix} a_{fl} \\ b_{fl} \\ c_{fl} \end{bmatrix}. \quad (9)$$

In the above steps, $m_4$ and $m_5$ have been calculated. Given that $m_4=r_{12}$ and $m_5=-r_{11}$, according to formula (9), $r_{13}$ can be obtained, and combined with the properties of the rotation matrix, $r_{31}$ can be obtained, and $r_{31}$ can be expressed as follow:

$$r_{31} = \pm \frac{r_{12}(br_{13} - cr_{12})}{\sqrt{O - Q + S - W + E}}$$

$$O = a^2 r_{12}^4 + a^2 r_{12}^2 r_{13}^2 + 2abr_{11} r_{12} r_{13}$$

$$Q = 2acr_{11} r_{12}^2 r_{13} + 2ar_{11} r_{12}^3 + 2ar_{11} r_{12} r_{13}^2$$

$$S = b^2 r_{11}^2 r_{13}^2 + b^2 r_{12}^2 r_{13}^2$$

$$W = 2bcr_{11}^2 r_{12} r_{13} + 2bcr_{12}^3 r_{13} + 2br_{11}^2 r_{13}^2$$

$$E = c^2 r_{11}^2 r_{12}^2 + c^2 r_{12}^4 + 2cr_{11}^2 r_{12} r_{13} + r_{11}^2 r_{12}^2 + r_{11}^2 r_{13}^2;$$

wherein, O, Q, S, W and E are intermediate parameters, $a=a_{fl}$, $b=b_{fl}$ and $c=c_{fl}$.

Assume that $r_{31}>0$. Based on the properties of the rotation matrix, $r_{21}$, $r_{22}$ and $r_{23}$ can be calculated. Since both the auxiliary camera coordinate system and the line-scan camera coordinate system are right-handed coordinate systems, and no reflection occurs, the determinant of the rotation matrix should be plus one (+1). If the determinant of the calculated rotation matrix $R_{fl}$ satisfies the following inequality:

$$\det R_{fl} = \det \begin{bmatrix} r_{11} & r_{12} & r_{13} \\ r_{21} & r_{22} & r_{23} \\ r_{31} & r_{32} & r_{33} \end{bmatrix} > 0.$$

And then the rotation matrix is correct. Otherwise, it is necessary to assume $r_{31}<0$ and recompute the rotation matrix $R_{fl}$.

In the previous steps, $m_1$, $m_2$ and $R_{fl}$ have been obtained. Additionally, since $m_1=-u_0 r_{12}-f_x r_{32}$ and $m_2=u_0 r_{11}+f_x r_{31}$, the internal parameters $u_0$ and $f_x$ of the line-scan camera can be solved.

Since a coordinate origin of the line-scan camera coordinate system lies on the imaging plane, the translation vector $T_{fl}$ in the rigid transformation matrix satisfies the following equation (10):

$$A_{fl} t_x + B_{fl} t_y + C_{fl} t_z + D_{fl} = 0. \quad (9)$$

By combining $m_3$ and $m_6$ from the previous steps, the value of the translation vector $T_{fl}$ can be determined by the following equations:

$$\begin{cases} t_x = \dfrac{(Bm_3 r_{23} + Cm_3 r_{33} + Cf_x m_6 r_{13} - Df_x r_{13} r_{23} + Bm_6 r_{23} u_0 + Cm_6 r_{33} u_0)}{r_{23}(Af_x r_{13} + Bf_x r_{23} + Cf_x r_{33})} \\ t_y = -\dfrac{Am_3 - Cf_x m_6 + Df_x r_{23} + Am_6 u_0}{Af_x r_{13} + Bf_x r_{23} + Cf_x r_{33}} \\ t_z = -\dfrac{D - Bt_y + At_x}{C} \end{cases} \; ;$$

wherein, $A=A_{fl}$, $B=B_{fl}$, $C=C_{fl}$ and $D=D_{fl}$.

The rotation matrix $R_{fl}$, which has been obtained for the rigid transformation between the two cameras, equation (11) can be adopted to convert the motion vector from the auxiliary camera coordinate system to the line-scan camera coordinate system:

$$\begin{bmatrix} V_{l-X} \\ V_{l-Y} \\ V_{l-Z} \end{bmatrix} = V_l = R_{fl} V_f. \quad (11)$$

At this point, all 11 unknown parameters in the basic model of the line-scan camera have been solved using linear and analytical methods.

Furthermore, after step 105, the method also includes:

optimizing the internal parameters of the line-scan camera and the rigid transformation matrix between the auxiliary camera and the line-scan camera.

For high-precision camera geometric calibration, the parameters obtained from the above steps are not the optimal results. The main reason is that the lens distortion of the line-scan camera has not been considered in the above solution process.

According to Brown's distortion model theory, the formula for the effect of lens distortion parameters on the image point coordinates is:

$$x' = x(1 + k_1 x^2 + k_2 x^4) + p_1(x^2 + 2x^2) = x + 3p_1 x^2 + k_1 x^3 + k_2 x^5; \quad (12)$$

where $k_1$ and $k_2$ represent the radial distortion coefficients, and $p_1$ represents the tangential distortion coefficient. This more accurately models the radial and tangential distortions of the lens.

Figure 5:
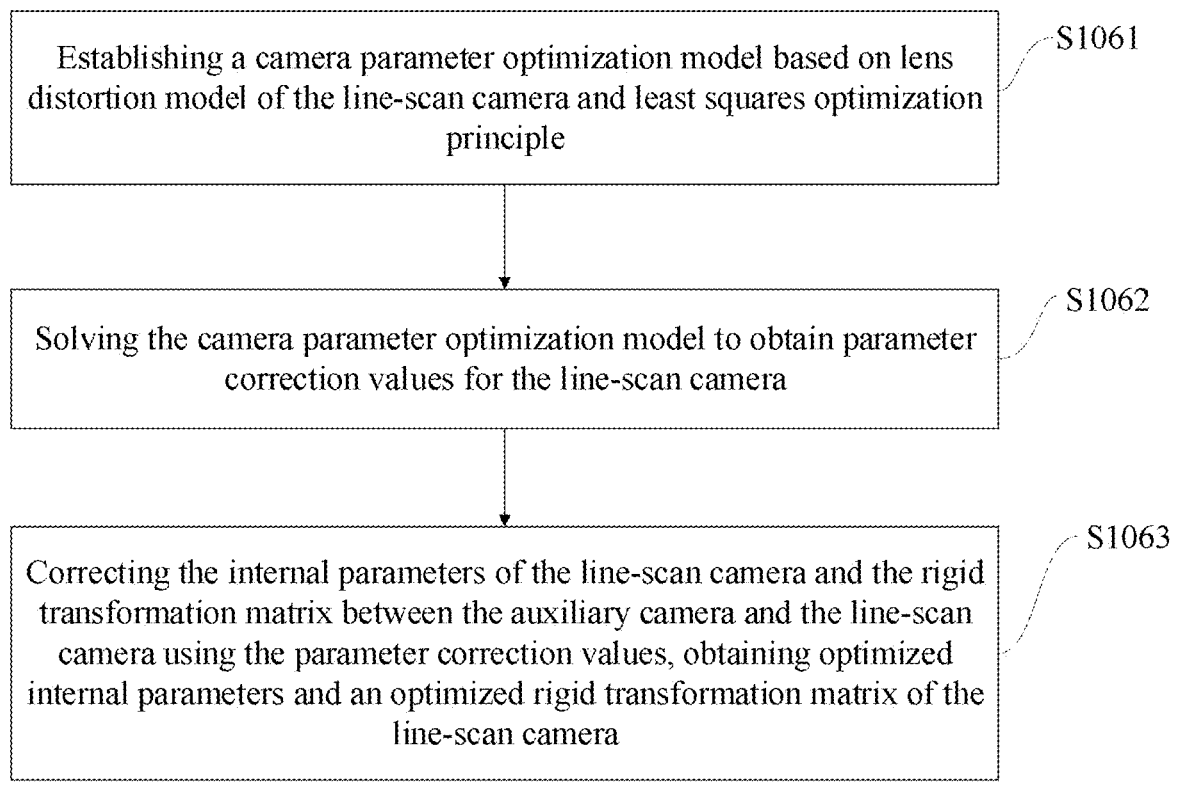
FIG. 5 is another detailed flowchart illustrating a line-scan camera calibration method based on an auxiliary camera according to an embodiment of the present application.

Specifically, as shown in FIG. 5, the step of optimizing the internal parameters of the line-scan camera and the rigid transformation matrix between the auxiliary camera and the line-scan camera includes:

S1061: establishing a camera parameter optimization model based on lens distortion model (equation 12) of the line-scan camera and least squares optimization principle; and S1062: solving the camera parameter optimization model to obtain parameter correction values for the line-scan camera; and S1063: correcting the internal parameters of the line-scan camera and the rigid transformation matrix between the auxiliary camera and the line-scan camera using the parameter correction values, obtaining optimized internal parameters and an optimized rigid transformation matrix of the line-scan camera.

Define a rotation angle around the Z-axis as $\gamma$, a rotation angle around the Y-axis as $\beta$, and a rotation angle around the X-axis as $\alpha$. The rotation components are defined to satisfy four conditions: counterclockwise rotation is considered the positive direction, the rotation axis is fixed, the rotation sequence is $\gamma$-$\beta$-$\alpha$, and the rotation component values are in the range of $-\Pi/2 \le \beta \le \Pi/2$, $-\Pi \le \alpha \le \Pi$ and $-\Pi \le \gamma \le \Pi$. It is also known that the world coordinate system, the auxiliary camera coordinate system, and the line-scan camera coordinate system are all right-handed coordinate systems, so the rotation matrix $R_{fl}$ in the rigid transformation can be uniquely decomposed into a set of rotation components. Thus the $R_{fl}$ can be expressed as:

$$R_{fl} = \begin{bmatrix} r_{11} & r_{12} & r_{13} \\ r_{21} & r_{22} & r_{23} \\ r_{31} & r_{32} & r_{33} \end{bmatrix} \quad (13)$$

$$= \begin{bmatrix} 1 & 0 & 0 \\ 0 & \cos\alpha & -\sin\alpha \\ 0 & \sin\alpha & \cos\alpha \end{bmatrix} \begin{bmatrix} \cos\beta & 0 & \sin\beta \\ 0 & 1 & 0 \\ -\sin\beta & 0 & \cos\beta \end{bmatrix} \begin{bmatrix} \cos\gamma & -\sin\gamma & 0 \\ \sin\gamma & \cos\gamma & 0 \\ 0 & 0 & 1 \end{bmatrix}$$

$$= \begin{bmatrix} \cos\beta\cos\gamma & -\cos\beta\sin\gamma & \sin\beta \\ \cos\alpha\sin\gamma + \cos\gamma\sin\alpha\sin\beta & \cos\alpha\cos\gamma - \sin\alpha\sin\beta\sin\gamma & -\cos\beta\sin\alpha \\ \sin\alpha\sin\gamma - \cos\alpha\cos\gamma\sin\beta & \cos\gamma\sin\alpha + \cos\alpha\sin\beta\sin\gamma & \cos\alpha\cos\beta \end{bmatrix}$$

In visual measurement, the least squares solution is generally considered the best output result, so the optimal parameter values can be obtained by minimizing the following function:

$$\min \sum_{i=1}^{N} \left[(u_i - \hat{u}_i)^2 + (0 - \hat{v}_i)^2\right]; \quad (14)$$

In this function, $u_i$ represents the X-coordinate of the sub-pixel point i detected in the real scanned image, $(\hat{u}_i, \hat{v}_i)$ represents the coordinate obtained by re-projecting point i using the spatial point and the camera model, and N is the number of re-projected points.

Based on the line-scan camera imaging model and lens distortion model, the formula for the re-projected point coordinates $(\hat{u}_i, \hat{v}_i)$ can be derived:

$$\begin{cases} \hat{u} = u_0 + \dfrac{\hat{x} + 3p_1\hat{x}^2 + k_1\hat{x}^3 + k_2\hat{x}^5}{S_x} \\ \hat{v} = \dfrac{r_{21}X_f^{(v)} + r_{22}Y_f^{(v)} + r_{23}Z_f^{(v)} + t_y}{V_{l-Y}} \end{cases} ; \quad (15)$$

wherein, $S_x$ is the pixel size of the line-scan camera in the X-direction, $f = f_x S_x$, $$\hat{x} = f \frac{r_{11}X_f^{(v)} + r_{12}Y_f^{(v)} + r_{13}Z_f^{(v)} + t_x}{r_{31}X_f^{(v)} + r_{32}Y_f^{(v)} + r_{33}Z_f^{(v)} + t_z},$$

and $\hat{x}$ is the x-coordinate of the re-projected point of the spatial point $(\hat{x}, 0)$ in the line-scan camera's image coordinate system when distortion is not considered.

After linearizing with a first-order Taylor expansion, the error equation is as follows:

$$\begin{cases} e_u = u - \hat{u} + \dfrac{\partial \hat{u}}{\partial u_0}\Delta u_0 + \dfrac{\partial \hat{u}}{\partial p_1}\Delta p_1 + \dfrac{\partial \hat{u}}{\partial k_1}\Delta k_1 + \dfrac{\partial \hat{u}}{\partial k_2}\Delta k_2 + \dfrac{\partial \hat{u}}{\partial f}\Delta f + \\ \quad \dfrac{\partial \hat{u}}{\partial \alpha}\Delta\alpha + \dfrac{\partial \hat{u}}{\partial \beta}\Delta\beta + \dfrac{\partial \hat{u}}{\partial \gamma}\Delta\gamma + \dfrac{\partial \hat{u}}{\partial t_x}\Delta t_x + \dfrac{\partial \hat{u}}{\partial t_z}\Delta t_z \\ e_v = v - \hat{v} + \dfrac{\partial \hat{v}}{\partial \alpha}\Delta\alpha + \dfrac{\partial \hat{v}}{\partial \beta}\Delta\beta + \dfrac{\partial \hat{v}}{\partial \gamma}\Delta\gamma + \dfrac{\partial \hat{v}}{\partial t_y}\Delta t_y \end{cases} ; \quad (16)$$

In this equation, $(e_u, e_v)$ represents the re-projection error for each point, and $\Delta$ represents the correction value for the corresponding parameter.

Rewriting equation (16) in vector and matrix form, the camera parameter optimization model can be expressed as follows:

$$e_i = D_i \cdot M + g_i;$$

$$e_i = [e_u \; e_v]^T;$$

$$M = [\Delta u_0 \; \Delta p_1 \; \Delta k_1 \; \Delta k_2 \; \Delta f \; \Delta\alpha \; \Delta\beta \; \Delta\gamma \; \Delta t_x \; \Delta t_y \; \Delta t_z]^T;$$

$$g_i = [u - \hat{u} \; v - \hat{v}];$$

$$D_i = \begin{bmatrix} \dfrac{\partial \hat{u}}{\partial u_0} & \dfrac{\partial \hat{u}}{\partial p_1} & \dfrac{\partial \hat{u}}{\partial k_1} & \dfrac{\partial \hat{u}}{\partial k_2} & \dfrac{\partial \hat{u}}{\partial f} & \dfrac{\partial \hat{u}}{\partial \alpha} & \dfrac{\partial \hat{u}}{\partial \beta} & \dfrac{\partial \hat{u}}{\partial \gamma} & \dfrac{\partial \hat{u}}{\partial t_x} & 0 & \dfrac{\partial \hat{u}}{\partial t_z} \\ 0 & 0 & 0 & 0 & 0 & \dfrac{\partial \hat{v}}{\partial \alpha} & \dfrac{\partial \hat{u}}{\partial \beta} & \dfrac{\partial \hat{u}}{\partial \gamma} & 0 & \dfrac{\partial \hat{v}}{\partial t_y} & 0 \end{bmatrix}.$$

Each pair of registered points $(u_i, 0)$ and $(X_f^{(v)}, Y_f^{(v)}, Z_f^{(v)})$ can form the above equation. According to the least squares adjustment theory, let the error vector E=0, yielding:

$$0 = D \cdot M + G.$$

Solving the above overdetermined linear system gives the least squares solution M, where M represents the correction for the internal parameters of the line-scan camera and the rigid transformation matrix. By iterating through the optimization process until the re-projection error satisfies the required tolerance, the optimal solution M is obtained, which gives the parameter correction for the line-scan camera. These corrections are used to adjust the internal parameters of the line-scan camera and the rigid transformation matrix between the auxiliary camera and the line-scan camera, ultimately resulting in the optimized internal parameters and transformation matrix of the line-scan camera, achieving high-precision calibration of the line-scan camera.

This embodiment of the present application proposes the line-scan camera calibration method based on the auxiliary camera. This method adopts the area array camera as the auxiliary device and performs high-precision calibration of the line-scan camera mounted on a motion platform using rigid transformation. The method not only improves the accuracy and reliability of the calibration but also is simple to operate, cost-effective, and widely applicable in industrial measurement fields. Compared to the dynamic scanning calibration methods commonly used in industry, this method based on an auxiliary camera to calibrate the line-scan camera parameters reduces the number of images required for calibration and improves calibration accuracy. Compared to existing joint calibration methods for line-scan and flat-array cameras, this method does not require the simultaneous use of a checkerboard calibration pattern and a custom irregular image plate. Compared to existing static calibration methods, this method uses dynamic scanning for calibration, which allows for the acquisition of a large number of registered points, thereby improving the calibration precision.

Furthermore, this application considers the lens distortion of the line-scan camera. Based on the line-scan camera lens distortion model and the least squares optimization principle, a camera parameter optimization model is established. By optimizing the camera parameter model, the optimized parameters of the line-scan camera are obtained, which further improves the calibration accuracy of the line-scan camera.

The above is the embodiment of the line-scan camera calibration method based on an auxiliary camera provided in this application. The following describes a line-scan camera calibration device based on an auxiliary camera provided in this application.

Figure 6:
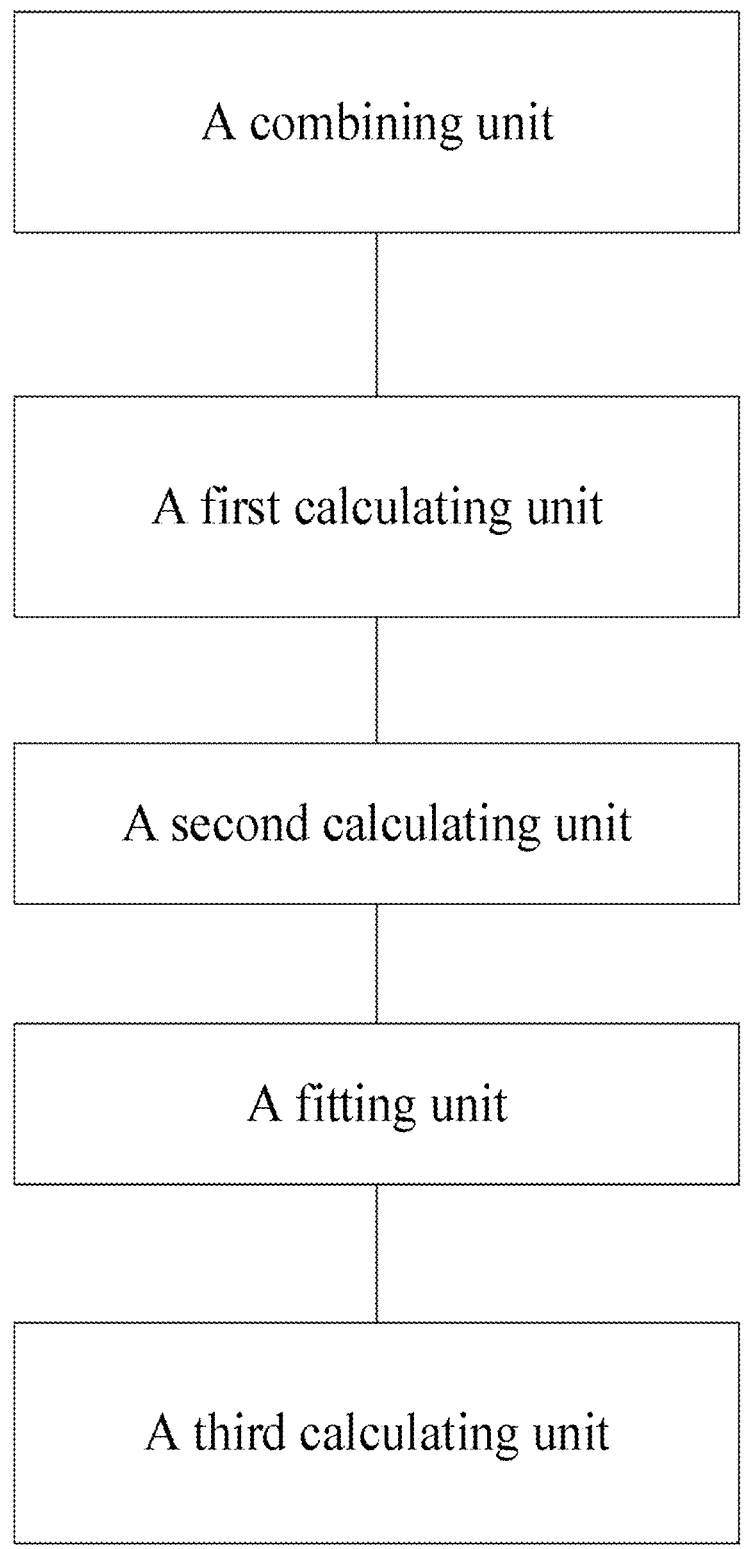
FIG. 6 is a structural diagram of a line-scan camera calibration device based on an auxiliary camera according to an embodiment of the present application.

With reference to FIG. 6, a line-scan camera calibration device based on an auxiliary camera, provided in the embodiment of this application, includes: a combining unit, configured for calibrating the auxiliary camera, and then rigidly combining the auxiliary camera with a line-scan camera to be calibrated to obtain a combined camera and installing the combined camera onto a motion platform, and placing a checkerboard calibration board within an imaging area of the combined camera; and a first calculating unit, configured for driving a motion platform to capture images of the checkerboard calibration board taken by the auxiliary camera at an initial position and a final position, as well as dynamic scanning images taken by the line-scan camera, and calculating a motion vector of the combined camera in an auxiliary camera coordinate system; and a second calculating unit, configured for calculating coordinates of registration points in the auxiliary camera coordinate system based on the motion vector and dynamic scanning images; and a fitting unit, configured for fitting an equation of an imaging plane of the line-scan camera in the auxiliary camera coordinate system using coordinates of multiple registration points in the auxiliary camera coordinate system; and a third calculating unit, configured for calculating internal parameters of the line-scan camera and a rigid transformation matrix between the auxiliary camera and the line-scan camera based on properties of a rotation matrix and a line-scan camera imaging model.

Furthermore, the first calculating unit, specifically configured for: capturing the checkerboard calibration board image taken by the auxiliary camera at the initial position, driving the motion platform to move the combined camera along a straight line for a preset distance, enable the line-scan camera to capture the dynamic scanning images at a target number of rows, and capturing the checkerboard calibration board image taken by the auxiliary camera at the final position; and based on the checkerboard calibration board images taken by the auxiliary camera at the initial position and the final position, calculating external parameters of the auxiliary camera at the initial position and the final position using an N-point perspective monocular visual positioning method; and calculating the motion vector of the combined camera in the auxiliary camera coordinate system based on the external parameters of the auxiliary camera at the initial position and the final position and the target number of rows.

Furthermore, the second calculating unit, specifically configured for: calculating the coordinates of the registration points in the auxiliary camera coordinate system using the motion vector, subpixel coordinates of the registration points in the dynamic scanning images, and subpixel coordinates of checkerboard corner points in the dynamic scanning images.

Furthermore, the second calculating unit, specifically configured for: using properties of the rotation matrix in a rigid transformation and the line-scan camera imaging model, transforming the coordinates of the multiple registration points in the auxiliary camera coordinate system into the line-scan camera coordinate system, and then, transforming the coordinates of the registration points in the line-scan camera coordinate system into a pixel coordinate system to obtain an intermediate relationship; and S1052: separating known parameters from the intermediate relationship to obtain a relationship for unknown parameters; and S1053: obtaining a unit normal vector of the line-scan camera based on the equation of the imaging plane of the line-scan camera in the auxiliary camera coordinate system, and solving for the internal parameters of the line-scan camera and the rigid transformation matrix between the auxiliary camera and the line-scan camera based on the unit normal vector and the relationship for the unknown parameters.

Furthermore, the device also includes an optimizing unit, configured for: establishing a camera parameter optimization model based on lens distortion model of the line-scan camera and least squares optimization principle; and solving the camera parameter optimization model to obtain parameter correction values for the line-scan camera; and correcting the internal parameters of the line-scan camera and the rigid transformation matrix between the auxiliary camera and the line-scan camera using the parameter correction values, obtaining optimized internal parameters and an optimized rigid transformation matrix of the line-scan camera.

In the embodiment of this application, the line-scan camera to be calibrated is rigidly combined and undergoes high-precision calibration on a motion platform. This method not only improves the accuracy and reliability of the calibration but also offers simple operation and low cost, making it widely applicable in the field of industrial measurement. Compared to the dynamic scanning calibration methods commonly used in the industry, this method calibrates the line-scan camera parameters based on an auxiliary camera, reducing the number of images required for calibration and improving calibration accuracy. Compared to existing joint calibration methods for line-scan and area array cameras, this method does not require the simultaneous use of a checkerboard calibration plate and a custom irregular image plate. Compared to existing static calibration methods, this method uses dynamic scanning for calibration, allowing for the acquisition of a large number of registration points, thus improving calibration precision.

Furthermore, this application considers the lens distortion of the line-scan camera. Based on the line-scan camera's lens distortion model and the least squares optimization principles, a camera parameter optimization model is established. By optimizing this model, the optimized parameters of the line-scan camera are obtained, further improving the calibration accuracy of the line-scan camera.

Another embodiment of this application also provides an electronic device, which includes a processor and a memory. The memory is configured to store program code and transfer the program code to the processor. The processor executes the line-scan camera calibration method based on an auxiliary camera as described in the previous embodiment, according to the instructions in the program code.

Another embodiment of the application further provides a non-transitory computer-readable storage medium, which is used to store program codes. The program codes are executed by a processor to implement the line-scan camera calibration method based on an auxiliary camera, as described in the previous method embodiment.

Those skilled in the art will clearly understand that, for the sake of simplicity and convenience in description, the specific operation processes of the devices and units described above can be referenced from the corresponding processes in the previous method embodiments, and thus will not be repeated here.

The terms "first", "second", "third", "fourth", etc. (if present) used in the specification and the accompanying drawings are used to distinguish similar objects and are not necessarily intended to describe a specific order or sequence. It should be understood that such data can be interchangeable when appropriate, so the embodiments described in this application can be implemented in an order other than those illustrated or described here. Furthermore, the terms "include" and "have", as well as their variations, are intended to cover non-exclusive inclusion. For example, a process, method, system, product, or device that includes a series of steps or units is not limited to those steps or units explicitly listed but may also include other steps or units not explicitly listed or inherent to these processes, methods, products, or devices.

It should be understood that in this application, "at least one" refers to one or more, and "multiple" refers to two or more. The term "and/or" describes the relationship between associated objects and indicates three possible relationships. For example, "A and/or B" means that there can be A only, B only, or both A and B, where A and B can be singular or plural. The character "/" typically indicates a "or" relationship between the objects. "At least one of the following" or similar expressions refer to any combination of these items, including single items or any combination of plural items. For example, "at least one of a, b, or c" could represent: a, b, c, "a and b", "a and c", "b and c", or "a and b and c", where a, b, and c can be single or multiple items.

In the various embodiments provided in this application, it should be understood that the disclosed devices and methods can be implemented in other ways. For example, the device embodiments described above are merely illustrative. The division of units described is just one logical division, and in actual implementation, there could be different divisions. For instance, multiple units or components could be combined or integrated into another system, or some features may be omitted or not executed. Additionally, the coupling or communication connections discussed or shown between the units can be indirect, using interfaces, devices, or units, and can take electrical, mechanical, or other forms.

The units described as separate components may or may not be physically separated. The components shown as units may or may not be physical units, i.e., they could be located in one place or distributed across multiple network units. Depending on actual needs, some or all of the units can be selected to achieve the objectives of the embodiment.

Moreover, the functional units in each embodiment of this application can be integrated into a single processing unit, or each unit may physically exist separately. Two or more units can be integrated into one unit. These integrated units can be implemented in hardware or in the form of software functional units.

If the integrated units are implemented as software functional units and sold or used as independent products, they can be stored in a computer-readable storage medium. Based on this understanding, the technical solutions of this application, or parts of it, may be embodied in software products, where the computer software product is stored in a storage medium and includes instructions for executing all or part of the steps of the methods described in the various embodiments of this application through a computer device (which could be a personal computer, server, network device, etc.). The storage medium includes: USB drives, external hard drives, Read-Only Memory (ROM), Random Access Memory (RAM), non-transitory computer-readable storage medium, magnetic disks, optical discs, and other media that can store program code.

The above-described embodiments are merely intended to illustrate the technical solutions of this application and are not intended to limit them. Although the application has been described in detail with reference to the above embodiments, those skilled in the art should understand that modifications can be made to the technical solutions described in the previous embodiments or that certain technical features can be equivalently replaced. These modifications or replacements do not depart from the spirit and scope of the technical solutions of the embodiments of this application.

What is claimed is:

1. A line-scan camera calibration method based on an auxiliary camera, wherein comprising the following steps:
    calibrating the auxiliary camera, and then rigidly combining the auxiliary camera with a line-scan camera to be calibrated to obtain a combined camera and installing the combined camera onto a motion platform, and placing a checkerboard calibration board within an imaging area of the combined camera; and
    driving a motion platform to capture images of the checkerboard calibration board taken by the auxiliary camera at an initial position and a final position, as well as dynamic scanning images taken by the line-scan camera, and calculating a motion vector of the combined camera in an auxiliary camera coordinate system; and
    calculating coordinates of registration points in the auxiliary camera coordinate system based on the motion vector and dynamic scanning images; wherein, calculating the coordinates of the registration points in the auxiliary camera coordinate system using the motion vector, subpixel coordinates of the registration points in the dynamic scanning images, and subpixel coordinates of checkerboard corner points in the dynamic scanning images; and
    fitting an equation of an imaging plane of the line-scan camera in the auxiliary camera coordinate system using coordinates of multiple registration points in the auxiliary camera coordinate system; and
    calculating internal parameters of the line-scan camera and a rigid transformation matrix between the auxiliary camera and the line-scan camera based on properties of a rotation matrix and a line-scan camera imaging model.

2. The line-scan camera calibration method based on the auxiliary camera according to claim 1, wherein, the step of driving a motion platform to capture images of the checkerboard calibration board taken by the auxiliary camera at initial and final positions, as well as dynamic scanning images taken by the line-scan camera, and calculating a motion vector of the combined camera in an auxiliary camera coordinate system, comprising the following sub-steps:
    capturing the checkerboard calibration board image taken by the auxiliary camera at the initial position, driving the motion platform to move the combined camera along a straight line for a preset distance, enable the line-scan camera to capture the dynamic scanning images at a target number of rows, and capturing the checkerboard calibration board image taken by the auxiliary camera at the final position; and
    based on the checkerboard calibration board images taken by the auxiliary camera at the initial position and the final position, calculating external parameters of the auxiliary camera at the initial position and the final position using an N-point perspective monocular visual positioning method; and
    calculating the motion vector of the combined camera in the auxiliary camera coordinate system based on the external parameters of the auxiliary camera at the initial position and the final position and the target number of rows.

3. The line-scan camera calibration method based on the auxiliary camera according to claim 1, wherein, the step of calculating internal parameters of the line-scan camera and a rigid transformation matrix between the auxiliary camera and the line-scan camera based on properties of a rotation matrix and a line-scan camera imaging model, comprising the following sub-steps:

using properties of the rotation matrix in a rigid transformation and the line-scan camera imaging model, transforming the coordinates of the multiple registration points in the auxiliary camera coordinate system into the line-scan camera coordinate system, and then, transforming the coordinates of the registration points in the line-scan camera coordinate system into a pixel coordinate system to obtain an intermediate relationship; and separating known parameters from the intermediate relationship to obtain a relationship for unknown parameters; and obtaining a unit normal vector of the line-scan camera based on the equation of the imaging plane of the line-scan camera in the auxiliary camera coordinate system, and solving for the internal parameters of the line-scan camera and the rigid transformation matrix between the auxiliary camera and the line-scan camera based on the unit normal vector and the relationship for the unknown parameters.

4. The line-scan camera calibration method based on the auxiliary camera according to claim 1, wherein, after the step of calculating internal parameters of the line-scan camera and a rigid transformation matrix between the auxiliary camera and the line-scan camera based on properties of a rotation matrix and a line-scan camera imaging model, the method further comprises the following steps:

establishing a camera parameter optimization model based on lens distortion model of the line-scan camera and least squares optimization principle; and solving the camera parameter optimization model to obtain parameter correction values for the line-scan camera; and correcting the internal parameters of the line-scan camera and the rigid transformation matrix between the auxiliary camera and the line-scan camera using the parameter correction values, obtaining optimized internal parameters and an optimized rigid transformation matrix of the line-scan camera.

5. A line-scan camera calibration device based on an auxiliary camera, wherein comprising:

a combining unit, configured for calibrating the auxiliary camera, and then rigidly combining the auxiliary camera with a line-scan camera to be calibrated to obtain a combined camera and installing the combined camera onto a motion platform, and placing a checkerboard calibration board within an imaging area of the combined camera; and a first calculating unit, configured for driving a motion platform to capture images of the checkerboard calibration board taken by the auxiliary camera at an initial position and a final position, as well as dynamic scanning images taken by the line-scan camera, and calculating a motion vector of the combined camera in an auxiliary camera coordinate system; and a second calculating unit, configured for calculating coordinates of registration points in the auxiliary camera coordinate system based on the motion vector and dynamic scanning images; wherein, calculating the coordinates of the registration points in the auxiliary camera coordinate system using the motion vector, subpixel coordinates of the registration points in the dynamic scanning images, and subpixel coordinates of checkerboard corner points in the dynamic scanning images; and a fitting unit, configured for fitting an equation of an imaging plane of the line-scan camera in the auxiliary camera coordinate system using coordinates of multiple registration points in the auxiliary camera coordinate system; and a third calculating unit, configured for calculating internal parameters of the line-scan camera and a rigid transformation matrix between the auxiliary camera and the line-scan camera based on properties of a rotation matrix and a line-scan camera imaging model.

6. The line-scan camera calibration device based on an auxiliary camera according to claim 5, wherein the first calculating unit, specifically configured for:

capturing the checkerboard calibration board image taken by the auxiliary camera at the initial position, driving the motion platform to move the combined camera along a straight line for a preset distance, enable the line-scan camera to capture the dynamic scanning images at a target number of rows, and capturing the checkerboard calibration board image taken by the auxiliary camera at the final position; and based on the checkerboard calibration board images taken by the auxiliary camera at the initial position and the final position, calculating external parameters of the auxiliary camera at the initial position and the final position using an N-point perspective monocular visual positioning method; and calculating the motion vector of the combined camera in the auxiliary camera coordinate system based on the external parameters of the auxiliary camera at the initial position and the final position and the target number of rows.

7. An electronic device, wherein the device comprises a processor and a memory;

wherein the memory is configured to store program codes and transmit the program codes to the processor;

the processor is configured to execute a line-scan camera calibration method based on an auxiliary camera according to claim 1.

8. A non-transitory computer-readable storage medium, wherein the non-transitory computer-readable storage medium is configured to store program codes, and when the program codes are executed by a processor, a line-scan camera calibration method based on an auxiliary camera of claim 1 is implemented by the processor.

* * * * *